United States Patent
Wu et al.

(10) Patent No.: US 6,317,524 B1
(45) Date of Patent: Nov. 13, 2001

(54) ANTI-COUNTERFEIT DETECTION METHOD

(75) Inventors: John W. Wu, Rancho Palos Verdes; Mike C. Chen, Cerritos, both of CA (US); Zhigang Fan, Webster, NY (US); Kien A. Phong, Cerritos, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/301,899

(22) Filed: Apr. 29, 1999

(51) Int. Cl.$^7$ .................................................. G06K 9/32
(52) U.S. Cl. ......................... 382/298; 345/439; 358/451
(58) Field of Search .................................. 382/298, 135, 382/309; 356/71; 235/379; 194/4; 902/7; 702/37, 192

(56) References Cited

U.S. PATENT DOCUMENTS

| | | | |
|---|---|---|---|
| 5,678,155 | * 10/1997 | Miyaza | 399/366 |
| 5,845,008 | * 12/1998 | Katoh et al. | 382/217 |
| 6,067,374 | 5/2000 | Fan et al. | 382/135 |
| 6,091,844 | * 7/2000 | Fujii et al. | 382/135 |
| 6,181,813 | 1/2001 | Fan et al. | 382/135 |

* cited by examiner

*Primary Examiner*—Leo Boudreau
*Assistant Examiner*—Yosef Kassa

(57) ABSTRACT

This algorithm is a method for resizing and resampling an image in one step. In the vertical, process or slow scan, direction, from the resampling ratio and from the image size variation, an algorithm can compute where, on the page, the scan lines may be deleted. For a numerical example, if the input is 400 pixels per unit time, resampling of four to one would yield one scan line every $1/100$ of a unit. If, in addition, the image has to be reduced by 5%, then the final output would be one scan line every $1/95^{th}$ of a time unit. This algorithm accomplishes this result by using a running sum of error terms. Simply stated, if it is known that the previous output scan was output at exactly the right time, the error is zero, but if the scan was output too soon or too late, there will be an error term. For each new scan that is now output, $1/400^{th}$ of a time unit is added to the error term. Finally, when the error term rises to a predetermined threshold, then the algorithm knows that that is the closest approximation that can be made, the current scan line is output, $1/95^{th}$ of a time unit is subtracted from the running sum, and the algorithm proceeds to the next scans.

3 Claims, 2 Drawing Sheets

ANTI-COUNTERFEIT DETECTION METHOD

BACKGROUND OF THE INVENTION

A process and circuit for resampling and resizing a digital image where each iteration converts each n pixels on a scan line to an average pixel to resample to 1/n in the horizontal direction, and outputs one scan line for every n, plus or minus a small percentage, input scan lines to resample and resize the image in the vertical direction.

It is frequently necessary to change the size of an image slightly. For example, deleting alternate pixels will reduce an image to one half, and duplicating pixels will double the image size. To change image size by less than a multiple of two, an algorithm such as the nearest neighbor algorithm can be used to produce the necessary number of pixels.

It may also be necessary to resample image pixels. For example, if an image is scanned in on a scanner of higher pixel density and is to be processed or printed at a lower pixel density, conversion to a lower number of pixels per inch is required.

However, if image pixels are deleted in either of these processes, data will be lost. To minimize this, the pixels can be averaged first. That is, a number of pixels can be replaced by one average pixel.

The result of these operations is an image that is resampled and changed slightly in size while losing a minimum of image quality.

This process can be used in color copiers, as a first step in the prevention of counterfeiting. In its simplest form, paper currency can be counterfeited by placing it on the platen and copying it. To prevent this, currency has marks of various sizes, shapes and colors. The image output of the scanner can be analyzed, and the copying discontinued if a currency mark of a particular size is found by a currency detection circuit in the copier. To defeat this detection, a counterfeiter may set the scanner to magnify the image size enough so that the marks will not be recognized by the currency detector, and then reduce the image by the same amount when printing.

To prevent this, the detection circuit must be supplied with a number corresponding to the amount of magnification (or reduction) that the scanner was set to, and must reduce (increase) the image size by the same amount before testing for currency marks.

Additionally, the pixel density of the image is greater than that needed by the detection circuit, so the data is resampled first. With the addition of the averaging of the image pixels, the total process becomes averaging, sizing and resampling.

The final problem is that of circuit speed. When an original of any kind is placed on the platen, the copier can not start to print until the test for currency is complete, and since this test must be done for every original, the elapsed time must be as short as possible. There is therefore a need for an algorithm that can implemented in a pipe-lined circuit so that the elapsed time is minimized.

In this discussion, as an aid in understanding a numerical example will be used where the resampling will be assumed to be 4 to 1, and the resizing will be assumed to be between plus or minus 20%.

A typical color copier makes small changes in image size by slowing down the speed of the paper in the vertical, or slow scan direction, but in the fast scan direction the clock remains unchanged, and therefore the copier can only change the image size slightly by using a nearest neighbor algorithm to change the density of pixels in the horizontal, or fast scan, direction.

Therefore, in the horizontal direction, all that is required is resampling the pixels before the image is resized, and that is accomplished by averaging four pixels at a time, and using the result as the sampled pixel.

However, in the vertical direction, an image change of up to plus or minus 20% will also have to be made by using a reduction factor of between 3 and 5 to 1, this reduction being made by deleting the proper number of intervening scan lines.

A circuit for accomplishing all of this in a small amount of time is needed

SUMMARY OF THE INVENTION

This algorithm is designed to be implemented in a pipelined circuit which can average four consecutive pixels to produce one current averaged pixel (resampling in the horizontal direction) and at the same time determine if the pixels on the current scan line should be deleted or output (resampling and resizing in the vertical direction).

In the vertical direction, from the resampling ratio (4 to 1) and from the image size variation (+ or −20%) an algorithm can compute where, on the page, the scan lines should be. For a numerical example, if the input is 400 spots per unit of time, resampling would yield one scan line every $1/100$ of a unit. If, in addition, the image has to be reduced by 5%, then the final output would be one scan line every $1/95$th of a time unit. An algorithm could be constructed so that at each time when there should be a scan line, the nearest actual scan line will be output. This would produce the proper scan line output, but the process would be cumbersome.

This algorithm accomplishes the same result by using a running sum of error terms. Simply stated, if it is known that the previous output scan was output at exactly at the right time, the error is zero, but if the scan was output too soon or too late, there will be an error term. For each new scan that is not output, $1/400$ of a time unit is added to the error term. Finally, when the error term rises to a predetermined threshold, then the algorithm knows that that is the closest approximation that can be made, the current scan line is output, $1/95$ of a time unit is subtracted from the running sum, and the algorithm proceeds to the next scans.

The circuit uses a first section for four clock cycles to average the first four input pixels of the current scan, and a second section to do the resampling and resizing on the fifth clock cycle while the first section is starting on the four pixels of the next scan. Thus, the entire pipe-lined circuit operates the speed of the averaging section.

DETAILED DESCRIPTION OF THE INVENTION

Figure 1:
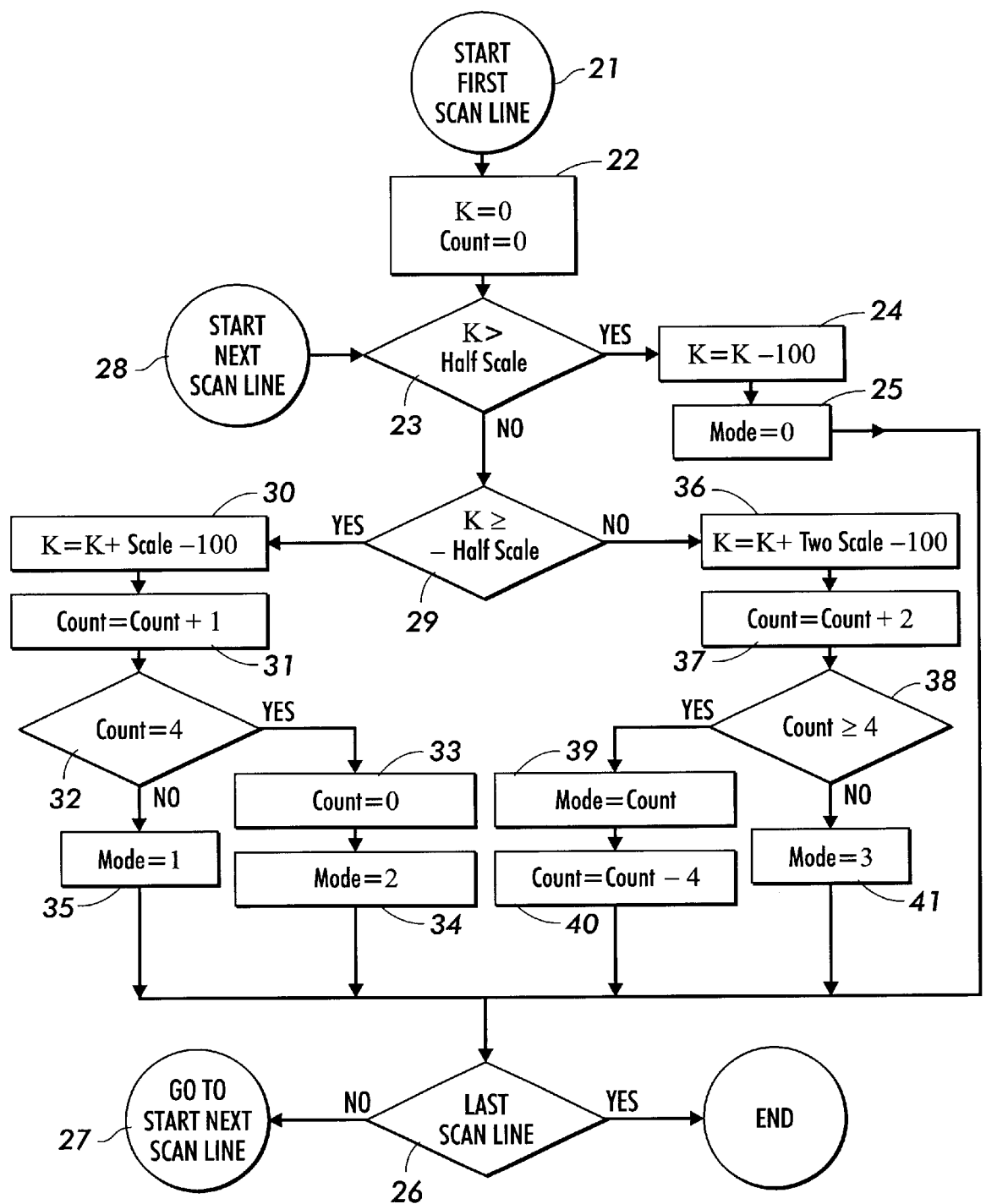
FIG. 1 is a flow chart of the algorithm.

The process proceeds by producing one average pixel for each group of four in each entire scan before going on the next scan. As each pixel is produced, it is either output or not as shown in Tables 1 and 2, which accomplish resampling and resizing. For these examples, the resampling rate in both cases is assumed to be 25%, so that the basic process results in three of every four scan lines being eliminated. This is shown for the first four "scanlines", y=0 through y=3, where the first three scanlines are not "output" and the fourth one is output.

TABLE 1

| scanlines | err_y = 0 | counter count_y = 0 | mode | output |
|---|---|---|---|---|
| y = 0 | 20 | 1 | 1 | |
| y = 1 | 40 | 2 | 1 | |
| y = 2 | 60 | 3 | 1 | |
| y = 3 | 80 | 4 → 0 | 2 | output |
| y = 4 | −20 | 0 | 0 | skip |
| y = 5 | 0 | 1 | 1 | |
| y = 6 | 20 | 2 | 1 | |
| y = 7 | 40 | 3 | 1 | |
| y = 8 | 60 | 4 → 0 | 2 | output |
| y = 9 | 80 | 1 | 1 | |
| y = 10 | −20 | 1 | 0 | skip |
| y = 11 | 0 | 2 | 1 | |
| y = 12 | 20 | 3 | 1 | |
| y = 13 | 40 | 4 → 0 | 2 | output |
| y = 14 | 60 | 1 | 1 | |
| y = 15 | 80 | 2 | 1 | |
| y = 16 | −20 | 2 | 0 | skip |

TABLE 2

| scanlines | err_y = 0 | count_y = 0 | mode | output |
|---|---|---|---|---|
| y = 0 | −20 | 1 | 1 | |
| y = 1 | −40 | 2 | 1 | |
| y = 2 | −60 | 3 | 1 | |
| y = 3 | 0 | 5 → 1 | 5 | output |
| y = 4 | −20 | 2 | 1 | |
| y = 5 | −40 | 3 | 1 | |
| y = 6 | −60 | 4 → 0 | 2 | output |
| y = 7 | 0 | 2 | 3 | |
| y = 8 | −20 | 3 | 1 | |
| y = 9 | −40 | 4 → 0 | 2 | output |
| y = 10 | −60 | 1 | 1 | |
| y = 11 | 0 | 3 | 3 | |
| y = 12 | −20 | 4 → 0 | 2 | output |
| y = 13 | −40 | 1 | 1 | |
| y = 14 | −60 | 2 | 1 | |
| y = 15 | 0 | 4 → 0 | 4 | output |
| y = 16 | −20 | 1 | 1 | |

However, Table 1 also assumes that the magnification rate at the scanner was 120%, so that the resizing step will eliminate slightly more that 25% of the lines. This is shown by the fact that, there is only one output (y=8) for the next 5 scan lines (y=4 to y=8). Similarly, Table 2 assumes that the scanner magnification was 80%, and so there are times when there is an output every three lines.

In both tables, the "count–y=0" column indicates the count of a line counter that is incremented or reset for each scan line, and the "mode" column indicates how the current line will be handled. In mode 0 there is no output and the line count is not incremented, in mode 1 the line count is incremented and there is no output, in mode 2 the line count is zeroed and the current line is output, in mode 3 the line count is incremented twice with no output, in mode 4 the line count is set to 0 and there is an output, and in mode 5 the line count is set to 1 and there is an output. This set of results is generated by the following program.

Variable Sub-Sampling Rate for Image Scaling Algorithm

In the slow scan direction, instead of output one scan line for every four scan line (sub-sampling from 400 spi to 100 spi), output the scan line if the variable mode is>=4 or==2).

Calculation of the variable mode for each scan line.

```
Define scale = MAG (magnification setting if MAG = 120, scale = 120);
half_scale = scale / 2;
    two_scale = scale *2;
err_y = 0;
for (y=0. count_y = 0; y < scanlines; Y++)
{
        if (err_y > half_scale) {
        mode=0;
        err_y −= 100;
        }
    else if (err_y > = −half_scale) {
        err_y + = scale − 100;
        count_y ++;
        if (count_y ==4) {
            count_y = 0;
            mode=2;
        }
        else mode = 1;
    }
    else {
        err_y + =two_scale − 100;
        count_y + =2;
        if (count_y >=4) {
            mode = count_y;
            count_y −=4;
        }
        else mode = 3;
    }
}
```

To compare this program to Table 1, the initial conditions are:
scale=120.
half_scale=60.
two_scale is 240 for table 1.
err_y, y and line count are initialized to 0
Then, for each loop
If the error term, err_y, is greater than 60 (that would be 80), the mode is 0, 100 is subtracted from the current err_y (80) to equal −20, and the count is not incremented.
If err_y is greater than −half_scale (−40 to 60), increase err_y by 20, and increment count. If the count is 4, mode 2, increment line count, else mode 1 which is to reset line count to 0 and do not output a line.
The remainder of this program only applies to table 2 where
scale=80.
half_scale=40.
two_scale is 160
err_y (−60) is increased by two_scale (160)−100=60 to result in err-y=0, and the line count is increased by 2. If the count at this point is 4 or 5, the mode is set to that number, and the count is reduced by 4. Otherwise, the mode is 3, and there is no output.
This program is generalized in FIG. 1 which is a flow chart where K corresponds to err_y. The program starts at step 21, 22 by initializing the line count and err_y term to zero. If, step 23, the error term is greater than half scale, the error term is decreased by 100, step 24, and the Mode is set to 0, step 25 (the line count is not incremented). If that was not the last line, step 26, the process goes through step 27 to the next line, step 28.
If, step 23, the error term is equal or less than half scale, then step 29, if the error term is greater than—half scale, step 30, the error term is decreased by 100 and increased by the scale and the count is incremented, step 31. If now, step 32, the line count=4, step 33, the line count is reset to 0, the mode is 2 (one line is output), step 34, and there is a return to step 28. If, step 32, the count is not 4, then step 35, the mode is 1 and there is no output.

If, step 29, the error term is less than half scale, step 36, the error term is decreased by 100 and increased by two scale, and the count is increased by 2 at step 37. If the count is now greater than 4, step 38, step 39, set the mode to the count of 4 or 5 (output a line) and subtract 4 from the count, step 40. If, step 38, the count is less than 4, step 41, the mode is 3 (no output).

This algorithm produces output lines that are the closest approximation to the ideal result. To explain this, the following two examples are given to show how the error dispersion is optimized.

(1) For a magnified image with Scale=120, the objective of the algorithm is to delete 20 lines for every 120 input lines to restore the input image to the original size of Scale=100 and also to ensure that the deleted lines are evenly distributed across the 120 input lines to maintain the integrity of the input image.

For every Scale/(Scale−100) input lines, delete 1 line. In the case of Scale=120, for every 6 lines, delete 1 line. The number of lines not deleted is:

{Scale /(Scale−100)=100/(Scale−100). For Scale=120, the number of lines not deleted is 5. In other words, keep the first 5 lines and delete the $6^{th}$ line.

Define a variable err_y, for each line, increase the variable err_y by (Scale−100), and the next line is the line to be deleted. When err_y>60, decrease err_y by 100 and start over again.

The algorithm starts out with err_y=0 as an initial condition. For each line kept, increase err_y by (Scale−100) until err_y exceeds ½ Scale. Delete the next line and decrease err_y by 100 and start over again. Essentially, err_y is offset from ({½ Scale−100} to ½ Scale.

For the case of Scale=120, 100/(Scale−100)=5 after 5 lines, and err_y is increased to its full range of 100. For the next line, delete the $6^{th}$ line and decrease err_y by 100 and there is no left over in err_y.

For Scale=115, 100/(Scale−100)=6 with a remainder of 10. After 7 lines, err_y is increased to an absolute range of 105. Delete the $8^{th}$ line and decrease err_y by 100. The value of 5 is the error diffused to the next round of computation.

(2) For a reduced image with Scale=80, the objective of the algorithm is to duplicate 20 lines for every 80 input lines to restore the input image to the original size of Scale=100 and also to ensure that the duplicated lines are evenly distributed across the 80 input lines to maintain the integrity of the input image.

For every Scale/(100−Scale) input lines, duplicate 1 line. In the case of Scale=80, for every 4 lines, duplicate 1 line. The number of lines not duplicated is:

{Scale/(100−Scale)−1}=(2*Scale−100)/(100−Scale). For Scale=80, the number of lines not duplicated is 3. In other words, keep the first 3 lines. At the end of the $4^{th}$ line, duplicate the $4^{th}$ line.

Define a variable err_y, for each line. Decrease the variable err_y by (Scale−100). Until err_y<(2*Scale−100), the next line is the line to be duplicated. Add err_y by (2*Scale−100) and start over again.

The algorithm starts out with err_y=0 as an initial condition. For each line, decrease err_y by (Scale−100) until err_y is less than −½ Scale. Duplicate the next line at the end of the next line and add err_y by (2*Scale−100) and start over again. Essentially the range of err_y is offset from −½ Scale to [−½ Scale+(2*Scale−100)].

For the case of Scale=80, (2*Scale−100)/(100−Scale)=3 after 3 lines, and err_y is decreased the full range of 60. For the next line, duplicate the $4^{th}$ line and increase err_y by 60 and there is no left over in err_y.

For Scale=85, (2*Scale−100)/(100 −Scale)=4 with a remainder of 10. After 5 lines, err_y is decreased to a range of −75. At the end of $6^{th}$ line duplicate the $6^{th}$ line and increase err_y by 70.

The value of −5 is the error diffused to the next round of computation.

Figure 2:
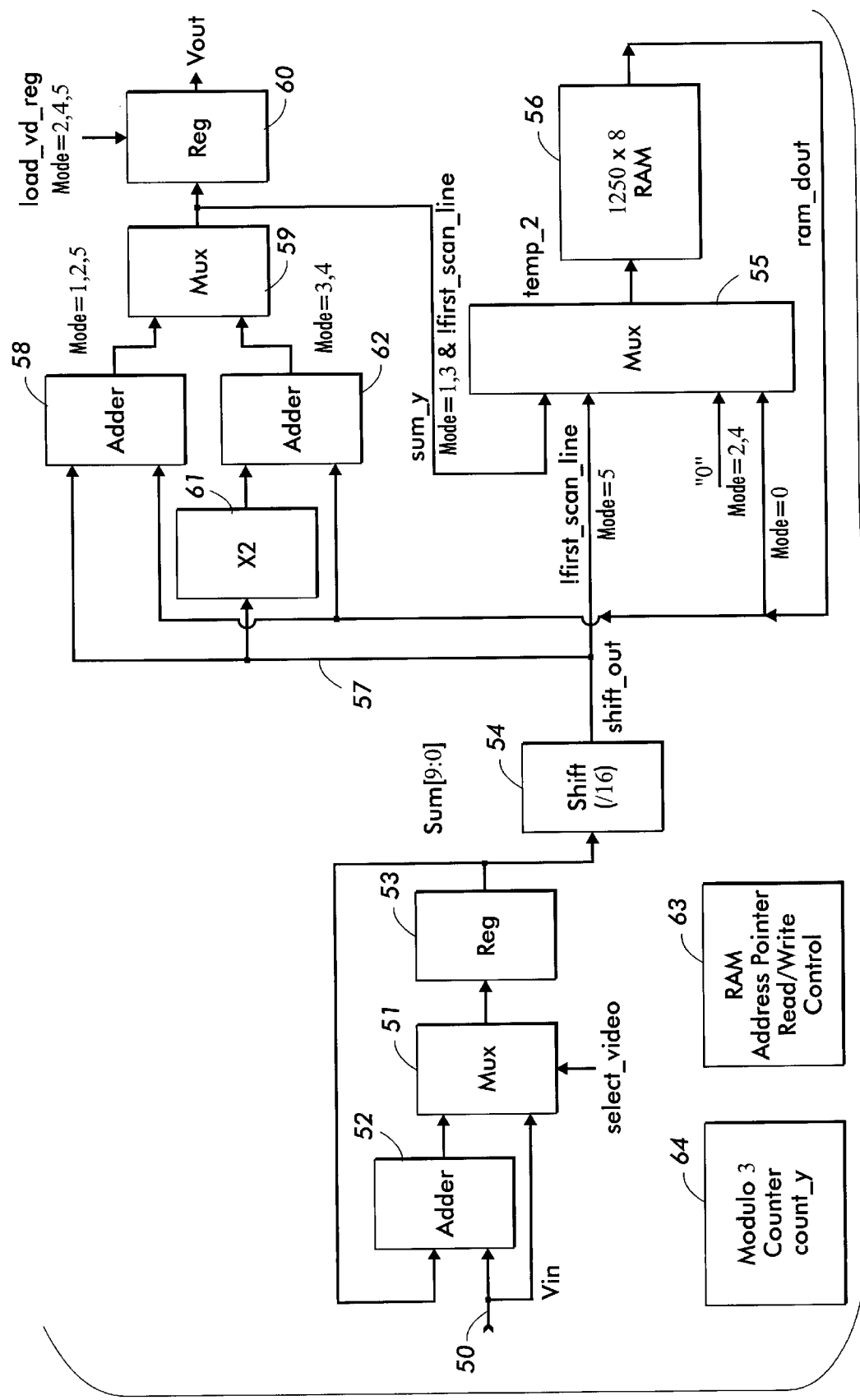
FIG. 2 is a simplified schematic diagram of the circuit.

The circuit for accomplishing the averaging, subsampling and resizing is the two-stage pipe-lined circuit of FIG. 2. The pixels are input at line 50. The first of the four input pixels of each block bypasses the adder 52 and is applied through the mux 51 to load the register 53. On the next three clocks, the pixels are used as one input to the adder 52 and the register content is used to supply the running sum to the other input. After the four input pixels of the block are summed into a ten bit number, the sum is divided by 16 at the shifter 54, and stored through mux 55 into the line buffer 56. (To get an average of four pixels, one would normally divide by four, but here it is known that eventually four lines of four pixels each will finally be summed, so the division by sixteen is done here in one step). At the end of the first scan line, the line buffer has a partial sum for each pixel.

For the next scan lines the sum from shifter 54 is applied to one input of adder 58 and the other adder input receives the partial sum from the line buffer transferred through mux 59 to the output register 60. If this result is yet another partial sum, it is loaded back into the line buffer 56 through mux 55. If this is the final averaged pixel, it is (usually) output through register 60.

A complication is that in mode 0 the entire scan line is ignored, and the line counter is not incremented. In all cases 16 pixels need to be averaged for each output pixel. In this Mode 0 case, there will be one output for five input scans, but only four will be used to supply the required total of 16 pixels.

Similarly, in Table 2 there are times when there is an output every three scan lines. To get 16 pixels in this case, one set is sent to a doubler 61 and added in adder 62 to get the correct output In addition, the modulo 3 counter 64 is used in the algorithm to generate the mode numbers as shown in the flow chart of FIG. 2, and a RAM address counter 63 is used to count down scan line clocks to generate an address pointer for RAM 56.

This entire circuit uses four clocks to average the four input pixels, and the remainder of the circuit is pipe-lined so that it will execute on the first clock of the next block.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A method of resizing and subsampling a video image of pixels by either outputting or not outputting each scan line of pixels, where the subsampling is by a factor of n, where n is an integer, comprising:

going to a first scan line, setting a scan count to zero, and setting an error value;

a) going to a next scan line and computing an error value that is a function of the error that would result if the next scan line were to be output, b) if the error value is greater than a first predetermined amount, decrementing the error value and returning to a), c) if the error value is greater than a second predetermined amount, incrementing the scan count and incrementing the error value, if the scan count is equal to n, outputting the next scan line, setting the scan count to zero, and returning to a); otherwise return to a), d) incrementing the scan count by 2 and incrementing the error value, e) if the scan count is equal to or greater than n, outputting the next scan line, decrementing the scan count by n, and returning to a); otherwise, returning to a).

2. The method of claim 1 wherein the error value is computed by, for each input scan line, adding to the error value a number that is a function of the distance between scan lines, and subtracting from the error value a number that is a function of a desired distance between output lines for each output scan line.

3. A method of resizing and subsampling a video image of pixels by either outputting or not outputting each scan line of pixels, comprising:

for each scan line, calculating an error that would result if the scan line were output;

comparing an error term to a predetermined threshold;

if the error term is less than the predetermined threshold, not outputting the scan line;

for each scan line that is not output, adding the calculated error to the error term;

if the error term is greater than or equal to the predetermined threshold, outputting the scan line and decrementing the error term.

* * * * *